United States Patent
Borries et al.

(10) Patent No.: US 7,478,397 B1
(45) Date of Patent: Jan. 13, 2009

(54) SERVICE-BASED INTERFACE METHOD

(75) Inventors: Steven Fred Borries, Minneapolis, MN (US); Paul Lambert Harper, Minneapolis, MN (US); Scott Darren Krieger, Lino Lakes, MN (US); Michael Clifford Stephens, Stillwater, MN (US)

(73) Assignee: Ameriprise Financial, Inc., Minneapolis, MN (US)

( * ) Notice: Subject to any disclaimer, the term of this patent is extended or adjusted under 35 U.S.C. 154(b) by 519 days.

(21) Appl. No.: 11/160,008

(22) Filed: Jun. 6, 2005

Related U.S. Application Data

(60) Provisional application No. 60/624,676, filed on Nov. 2, 2004.

(51) Int. Cl.
G06F 13/00 (2006.01)
(52) U.S. Cl. .......................... 719/311; 707/1; 707/100; 707/103 Z
(58) Field of Classification Search ................ 719/311; 707/1, 100, 103 Z
See application file for complete search history.

(56) References Cited

U.S. PATENT DOCUMENTS

| | | | |
|---|---|---|---|
| 7,155,501 B2 * | 12/2006 | Mandal et al. | 709/223 |
| 7,191,410 B1 * | 3/2007 | Kruempelmann et al. | 715/853 |
| 2001/0051907 A1 * | 12/2001 | Kumar et al. | 705/36 |
| 2005/0065879 A1 * | 3/2005 | Birch et al. | 705/40 |
| 2006/0074873 A1 * | 4/2006 | Dettinger et al. | 707/3 |

\* cited by examiner

*Primary Examiner*—Andy Ho
(74) *Attorney, Agent, or Firm*—Snell & Wilmer L.L.P.

(57) ABSTRACT

A method for combining the management of enterprise data along with a set of service design principles to allow users to derive the proper set of consistent services and structures is disclosed. The method leads to a more consistent, higher quality, lower cost service environment. The method also helps to standardize how companies create services, which will result in more consistent deliverables with decreased development time, development cost, and overall project risk. The method also promotes building a smaller set of highly reusable services, rather than a large set of single-use services, providing significant savings on service maintenance costs and high opportunities for cost avoidance through reuse.

19 Claims, 4 Drawing Sheets

SERVICE-BASED INTERFACE METHOD

CROSS-REFERENCE TO RELATED APPLICATIONS

This application claims priority to, and the benefit of, U.S. Provisional Application Ser. No. 60/624,676, filed Nov. 2, 2004 and entitled "System and Method for Object Base Service Interface Modules", which is hereby incorporated by reference in its entirety.

FIELD OF INVENTION

The invention generally relates to a method for defining services that expose enterprise data by incorporating a set of design principles, methods and data modeling techniques for deriving a proper set of consistent services and supporting data structures, and more particularly, to a method to support the construction of small sets of highly reusable services providing significant savings in service development and maintenance costs through reuse.

BACKGROUND OF INVENTION

Enterprises have long realized that in order to remain successful and sustain growth, they must be able to quickly adapt to changes in, for example, the market, economy and technology. Even with agile planning, forecasting and training, an inability of the computing infrastructure to sufficiently adapt to new requirements will often render all other activities moot. Software systems are typically constructed for single use purposes; that is, systems are implemented in response to specific requirements as the requirements are encountered. This leads to a number of systems that do their jobs well, but unfortunately, such systems are unable to integrate with other systems to provide more versatile uses and a holistic view of the enterprise.

This lack of systems integration has led to the development of number of methodologies and tools intended to bridge gaps between systems and create a pseudo heterogeneous computing environment. While many methods have been successful in creating a more integrated computing environment, the solutions did not typically encourage or foster reuse, while eliminating silos where information may be duplicated among two or more systems. A typical problem is that enterprises have several copies of similar data stored in diverse software applications that each focus on a specific business product or functional business area. A more adaptive computing architecture is needed for which a service-based architecture was developed.

The purpose of the service-based architecture is to design systems to be service providers. While a system may comprise hardware and software elements, it is ultimately providing services that can be consumed by other systems. Under a service-based architecture, systems that had been implemented to address specific business requirements in relative isolation are re-defined to be service providers. As such, they become useful not only for performing their intended purpose, but for providing services to other existing and future systems. Through an open standard interface, such as Simple Object Access Protocol (SOAP), services can be consumed by other systems regardless of platform differences. However, the full potential of a service-based architecture cannot be realized absent a method to ensure that redundant and inflexible services are not created.

Services are typically developed on an "as-needed" basis to meet the needs of individual groups within an enterprise, which often leads to a number of similar services, wherein each service is a slight variant of another service. Without the appropriate controls in place, a growing number of services typically increase the on-going maintenance costs of an enterprise's service components. The architectural objective of loose-coupling between requester and provider is often not fully realized, use of standard data names is often not consistently employed, and characteristics of the navigation of internal persistent structures are often evident within many service messages. Managing a service infrastructure is usually a prominent problem within enterprises of various industries, particularly since the adoption of an adaptive architecture approach by those enterprises.

Therefore, a need exists for a method to formally define what and how data is exposed by a component through its service interface and for providing a framework for developing a robust set of consistent, properly-scoped, base services within well-defined domains.

SUMMARY OF INVENTION

The invention provides a method for designing services at the enterprise level. The method results in more consistent deliverables with decreased development time, reduced development costs and a reduction in overall project risk. More specifically, the method promotes building smaller sets of highly reusable services, rather than a large set of single-use services, thereby providing significant savings in maintenance and development costs. The method employs a number of base services that may be called by a program. These base services create a loose coupling between the data layer and application layer.

By defining data within abstraction layer domains, the method enables structuring and naming of data elements with minimal or no modifications or disruptions to the actual data source. For example, a database table may have the following columns: "custID", "custAcctNo", "custSocial" and "custName", respectively. The same table columns may be defined within an abstraction layer domain as: ID, Account, Social, and Customer Name. Each element as defined within the abstraction is mapped to the actual table. Therefore, modifying the custAcctNo field within the database to AccountNo will have no impact on a service requiring access to specific customer information.

Services, which are developed against a set of defined data abstraction layer domains, provide a maintainable set of building blocks from which larger grained services can be built. The addition of a data abstraction layer domain allows for the creation of high-level business function oriented services, without the need to construct the services for direct access to a database. A service does not need to retain information regarding where system data resides, how system data is deployed, physical characteristics of the data, how to query the data, and the like: because this information is held within abstraction layer domains.

A data abstraction layer domain is defined by, for example, identifying a first relationship between entity classifications. The identification is accomplished by defining a data view based upon the relationship, wherein the data view is presented to a service associated with an object. A reference to a data abstraction layer domain is then added to a service, thereby eliminating direct access to the data itself.

BRIEF DESCRIPTION OF THE DRAWINGS

A more complete understanding of the method may be derived by referring to the detailed description and claims

DETAILED DESCRIPTION

The detailed description of exemplary embodiments of the method herein makes reference to the accompanying drawings, which show the exemplary embodiment by way of illustration and its best mode. While these exemplary embodiments are described in sufficient detail to enable those skilled in the art to practice the method, it should be understood that other embodiments may be realized and that logical and mechanical changes may be made without departing from the spirit and scope of the method. Thus, the detailed description herein is presented for purposes of illustration only and not of limitation.

For the sake of brevity, conventional data networking, application development and other functional aspects of the systems (and objects of the individual operating objects of the systems) may not be described in detail herein. Furthermore, the connecting lines shown in the various figures contained herein are intended to represent exemplary functional relationships and/or physical couplings between the various elements. It should be noted that many alternative or additional functional relationships or physical connections may be present in a practical system.

The invention is herein described as a method; however those skilled in the art will appreciate that a computing system may be configured to assist in the design of data abstraction layer domains according to the method described herein. For example, the disclosed method may be implemented through a computer program configured to provide a user interface to a user wherein a data abstraction layer domain is visually assembled based on existing database schemas and a resultant XML module is automatically assembled. Further, the method for defining a data abstraction layer domain may result in a physical computing infrastructure for carrying out any number of data processing functions.

Figure 1:
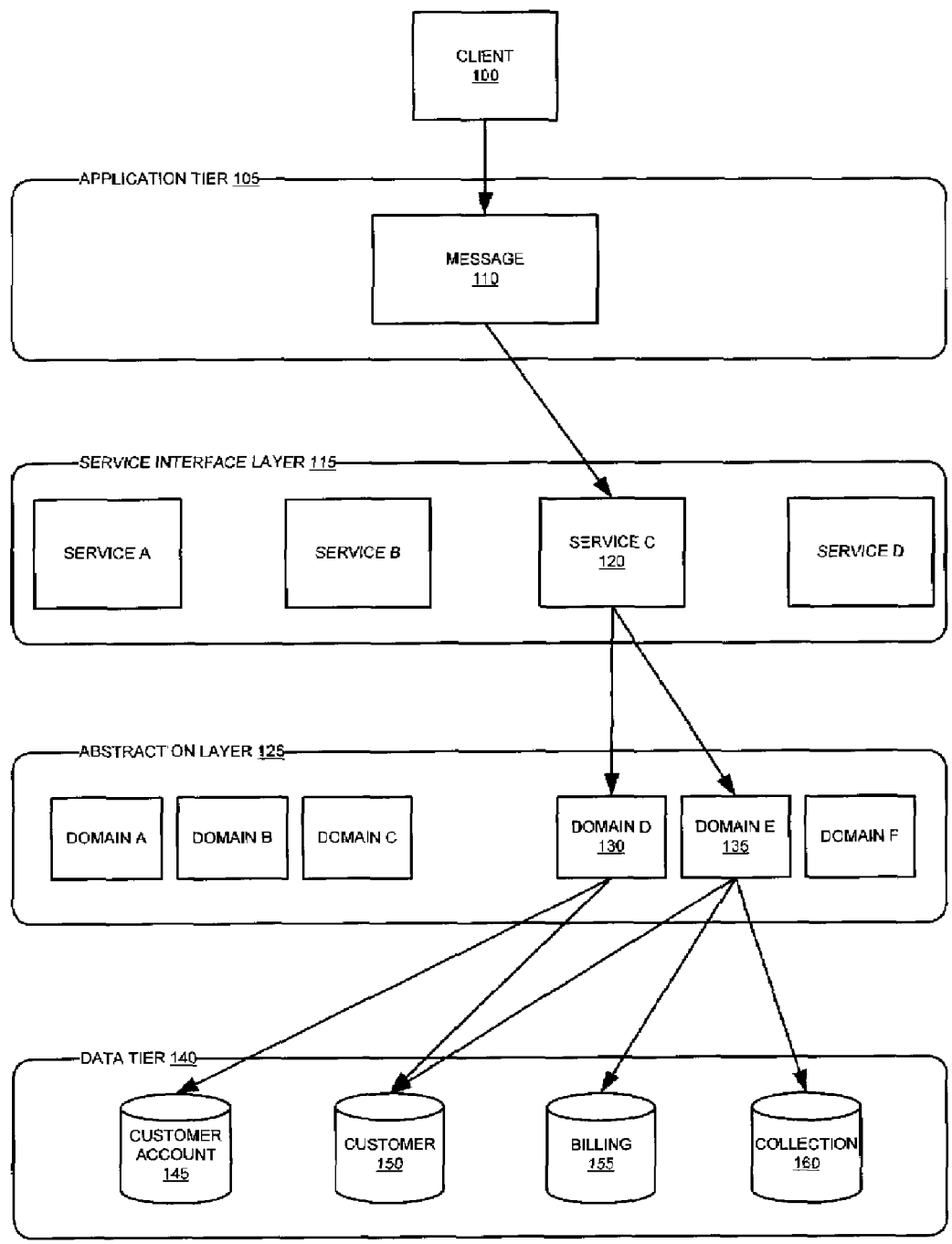
FIG. 1 is a block diagram illustrating an exemplary high-level view of the architectural elements in which the method of the present invention takes place.

In general, the invention includes a method for abstracting distinct data elements within abstraction layer domains. These domains reside within an abstraction layer dividing the application tier and data tiers within an n-tier architecture. FIG. 1 is a block diagram illustrating an exemplary high level view of the architectural elements in which the method of the present invention takes place. Further, in accordance with the abstraction layer 125 architecture, FIG. 1 demonstrates the interaction between the client 100, application tier 105, service interface layer 115, abstraction layer 125 and the data tier 140; all of which will be described in greater detail herein. Those skilled in the art will appreciate that the various elements illustrated in FIG. 1 are presented for explanation only, and any number of services, domains, messages, data components and users may be employed without departing from the scope of the method.

Client 100 may include any individual, business, entity, government organization, software and/or hardware which interacts with the method to search, obtain, add, delete and modify data. Client 100 may include any device (e.g., computer) which communicates (in any manner discussed herein) with the method via any network discussed herein. Client 100 may further include locally installed software and/or browser applications providing logic and an interface for interacting with the method. Such browser applications comprise Internet browsing software installed within a computing unit or system to conduct online transactions and communications. These computing units or systems may take the form of a computer or set of computers, although other types of computing units or systems may be used, including laptops, notebooks, hand held computers, set-top boxes, workstations, computer-servers, main frame computers, mini-computers, PC servers, pervasive computers, network sets of computers, and/or the like. Practitioners will appreciate that client 100 may or may not be in direct contact with the method. For example, client 100 may access the services of the method through another server, which may have a direct or indirect connection to a server.

As those skilled in the art will appreciate, client 100 may include an operating system (e.g., Windows NT, 95/98/2000, OS2, UNIX, Linux, Solaris, MacOS, etc.) as well as various conventional support software and drivers typically associated with computers. Client 100 may include any suitable personal computer, network computer, workstation, mini-computer, mainframe or the like. Client 100 can be in a home or business environment with access to a network. In an exemplary embodiment, access is through a network or the Internet through a commercially available web-browser software package.

Client 100 may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

Client 100 interacting with an application, whether directly or indirectly, may invoke a message 110 within the application tier 105. Message 110 may comprise information that is passed from an application within an application tier 105 to a service interface layer 115, wherein services expose and/or manipulate data related to a single, fundamental data concept (i.e. abstraction layer 125 domain) via a standard service type (e.g. Get, Search, Modify, etc.). For example, an enterprise may have a "customer" abstraction layer domain which includes all of the fundamental customer information, its dependent entities and information about the relationships it has to other fundamental entities.

"Message" is a term common in service-based architecture referring to the transfer of information, meaningful only to an application (consumer) and a service (supplier). As used herein, message 110 may represent a request message originating from client 100 or a response message being passed to client 100 from service object 120. Receipt of message 110 typically results in a method invocation within service object 120, and a reply message from service object 120 to the originating application in application tier 105. For example, an online banking customer may select a link from the bank's web site to view her savings account balance, thereby invoking application tier 105 to create and send request message 110. Request message 110 may include parameterized data such as an account number, authentication credentials, and a request for account data. According to existing service architecture methodologies, the message is directed to service 120 within service interface layer 115 which invokes the appropriate service function to request data from data tier 140. The requested information from a data tier 140 is received by service object 120 which formats and transmits the results to client 100 via a response message 110.

The method differs from existing methodologies in that an abstraction layer 125 is inserted between the service interface layer 115 and the data tier 140. In one embodiment, a direct connection between the services of service interface layer 115 and data elements of data tier 140 does not exist or is limited. The discussion herein will primarily focus on abstraction layer 125 in regard to its functionality and interaction with service interface layer 115 and data tier 140.

A message 110 originating at application tier 105 is passed to the appropriate service within the service interface layer 115. As used herein, a service provides an interface for one of more specialized functions and/or methods that may be invoked by any number of systems, applications and/or objects. For example, service C 120 may provide an interface to a number of business components which can be logically grouped behind a single service. A single service may have multiple message interfaces, each exposing the same abstraction layer domain via a different format. For example, a "GetGroup" message interface could have both an XML and a COBOL implementation that behave identically.

In response to a message 110, services generally invoke a business function of a component. Message 110 contains a service identifier along with any required and/or optional parameters. For example, to invoke a service to retrieve a list of customer names from a database, message 110 may contain a call to service 120 "Get" message interface (i.e. GetCustomerName). As a result, a "Get" method or function is invoked to request customer names from the appropriate domain within abstraction layer 125 and return the results to the application tier 105 in a response message. This is a very general example, and practitioners will appreciate that there a number of methods and formats for creating messages to invoke services. Further, while FIG. 1 illustrates a number of services within the service interface layer 115, any number of services may be employed.

Abstraction layer 125, as used herein, includes the names of data elements, data types, code values, higher level structures (e.g. entities and/or objects), and/or the relationships between the higher level structures. Abstraction layer 125 defines how data is viewed and updated via services and all physical data is mapped to and from this layer within specific abstraction layer domains for presentation and update. For example, in a complex database environment, a programmer must have a very good understanding of the database schema in order to write code to properly retrieve, display and manipulate data. Abstraction layer 125 models the physical implementation of data within abstraction layer domains; however, the abstraction layer domains are not bound by the definitions and relationships of the physical data. The various services of a single service 120 may reference varying data domains within abstraction layer 125. For example, an object service, GetCustomerAccount may be configured to retrieve customer names, account numbers, account types and account balances. In order to accomplish this, the service need only access domain D130 which maps both customer account 145 and customer 150 databases. The service does not need to understand the database schema of data tier 140.

Under the prior art, service C120 may need to be configured to query two or more database tables in order to retrieve the required data, thereby incurring greater development costs and maintenance costs. A change to a database schema within data tier 140, for example, would likely require the modification of a number of services referencing the modified database. However, under the same scenario in the present method, only the affected abstraction layer domains would require modification, because of the loose coupling between the service interface layer 115 and data tier 140.

A single domain may model any number of databases and/or tables. Domain E 135, for example, may model the customer 150, billing 155, and collection 160 databases and/ or tables. A service, "GetDelAccts" may reference domain E135 in order to retrieve account details relating to all delinquent accounts. If the billing and collection databases where, at a later time, combined; there would be no need to modify service 120, as would be required under the prior art. While described herein in reference to data, the method may be employed within any data driven environment and is not limited to databases only. For example, the method may be equally effective in mapping data to data files or any other memory structure.

Figure 2:
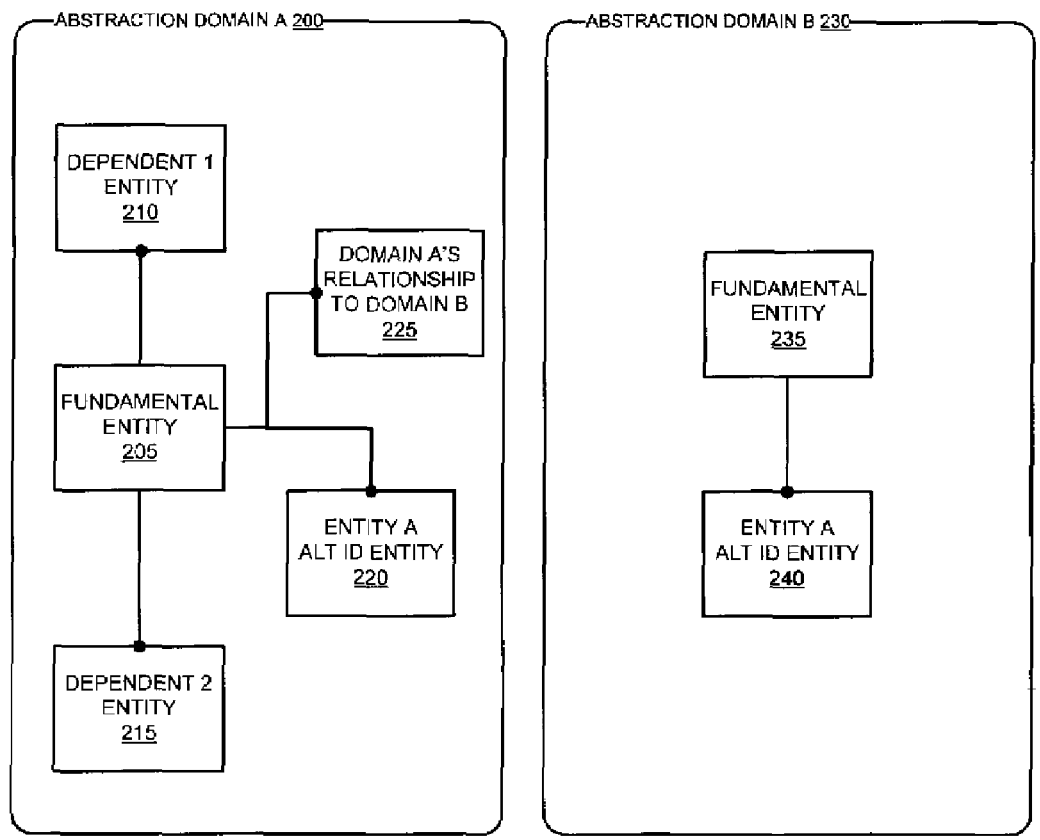
FIG. 2 is a block diagram illustrating general constructs for creating XML structures for an exemplary abstraction layer domain according to one embodiment of the present method.
Figure 4:
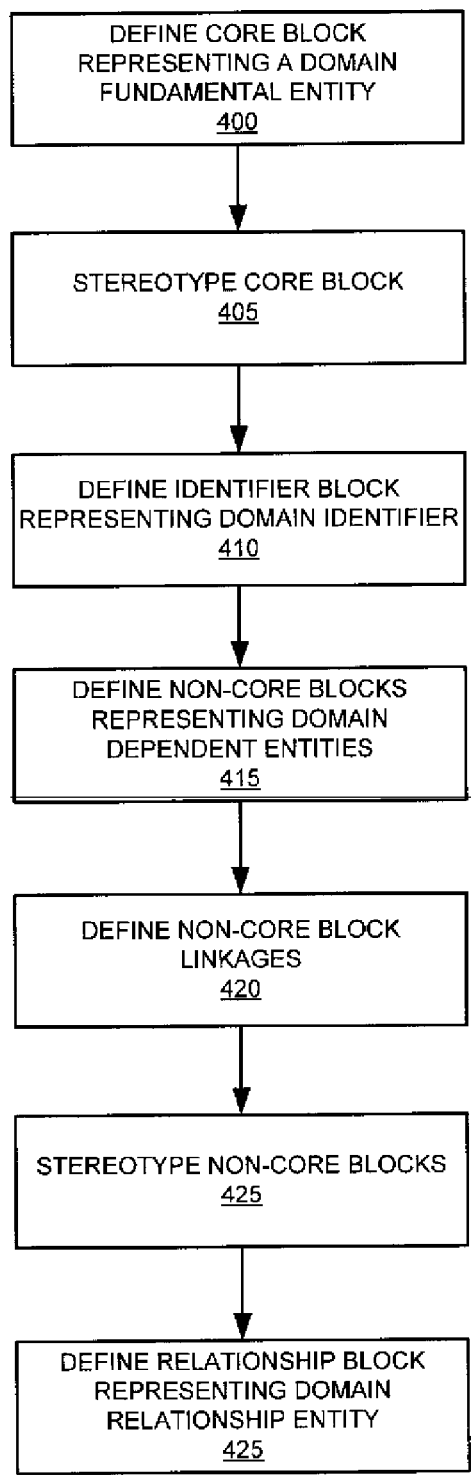
FIG. 4 is a flowchart illustrating exemplary steps to define constructs for creating XML structures for an abstraction layer domain according to one embodiment of the present method.

FIG. 2 is a block diagram illustrating general constructs for creating XML structures for an exemplary abstraction layer domain. In describing the creation of XML structures, occasional reference will be made to FIG. 4 which is a flowchart illustrating exemplary steps to define constructs for creating XML structures for an abstraction layer domain according to one embodiment of the present method.

The method models the relationships between physical data elements through XML; therefore, an abstraction layer domain has a corresponding XML module structure in the corresponding XML message. The XML module structure contains all of the XML content structures such as, for example, assemblies, blocks and elements. Following are general rules governing the abstraction model general constructs. An abstraction level domain 200 draws its identity and focus from a single subject area as derived from an object's Data of Record (DOR) Logical Data Model (LDM).

The fundamental entities 205 and 235 in abstraction layer domains 200 and 230, respectively, result in the creation of one XML core block structure within the XML module. The XML includes an element for the block and additional elements in that block for the attributes of the fundamental entity 205. Each abstraction layer domain 200 has one core block representing the fundamental entity 205 and 235 of a subject area from an object's DOR LDM (step 400). A core block may be stereotyped as either "independent" or "associative" (step 405). An independent core block represents an instance of a single subject area domain while, an associative block represents an instance of a union of two other subject area domains.

Each domain has an identifier block (220 and 240), which represents a set of identifiers belonging to the domain (step 410). In a preferred embodiment, each domain will have at least one identifier with the possibility of having multiple identifiers.

In one embodiment, each dependent entity 210 and 215 within the abstraction layer domain 200 and 230 includes similar block structures within the XML module. However, depending on data filter parameters, they may be optional, and further, may occur multiple times. Dependent entities 210 and 215 are considered non-core (step 415) and are linked to the core block in a strict hierarchical pattern. A linkage between blocks may represent a relationship between entities from an object's DOR LDM (step 420). A linkage may also represent a dependent linkage between blocks representing the same entity from an object's DOR LDM. In order to define non-core blocks to their predecessor, they may be individually stereotyped as "dependent", "subset", "collection", "relationship" or "recursive" (step 425). A dependent stereotype represents a block that is attributive to the immediate predecessor block within the domain. A subtype stereotype represents a variation of the immediate predecessor block within the domain, where a collection stereotype represents an intermediate block used to group lower level blocks for simpler service options. A relationship stereotype represents an association crossing the domain boundary or a reference to another domain and the recursive stereotype represents an association to a predecessor block within the hierarchy branch.

Defining a relationship block representing a relationship entity 225 (step 425) results in an assembly element within the XML module. The assembly is an element that includes blocks which represent the relationship block and the blocks representing the identifiers on each side of the relationship 225. Relationship blocks representing associations crossing boundaries may be stereotyped as "relationship". Both abstraction layer domains 200 and 230 within the relationship 225 are named to reflect the domain pairing from the perspective of the owning domain. The properties of each block is the same with the exception of key identity properties, therefore each block only carries the identity of the core block instance of the other domain. When the association crosses object boundaries, the context of the other domain is included within the association. According to FIG. 2, and in an exemplary embodiment, abstraction layer domain A 200 includes a relationship 225 defining in detail abstraction layer domain A's 200 relationship to abstraction layer domain B 230. However, abstraction layer domain B 230 does not define such a relationship with abstraction layer domain A 200.

Figure 3:
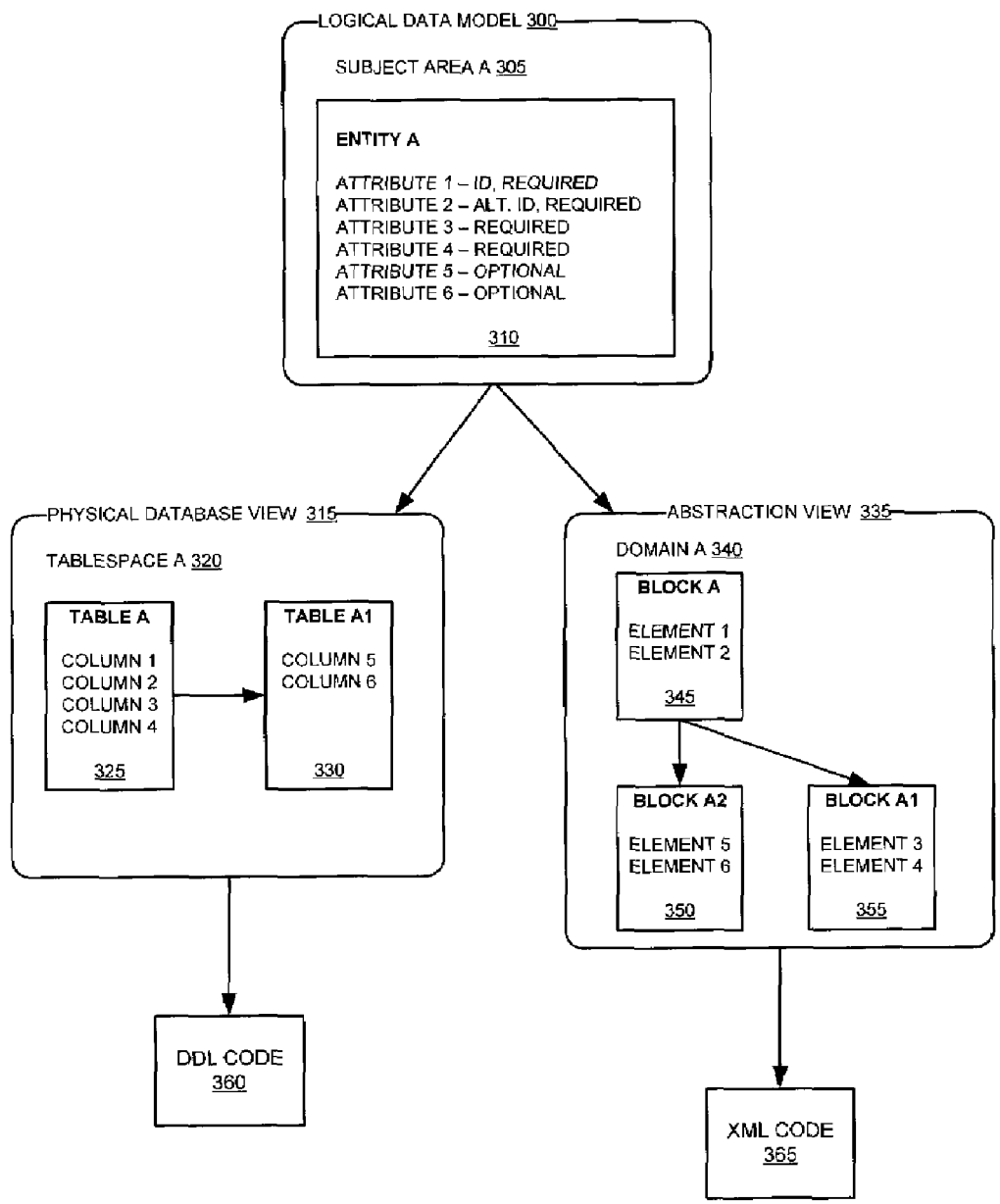
FIG. 3 is a block diagram illustrating an exemplary extraction of logical data model attributes to define a physical database view and abstraction view.

FIG. 3 is a block diagram illustrating an exemplary extraction of logical data model attributes to define a physical database view and abstraction view. Logical Data Modeling is a method that results in a data model representing the definition, characteristics, and relationships of data within an enterprise. LDM 300 is used to describe end-user data and to define entities, attributes and relationships in order to serve as a blueprint for the physical database 315.

Subject area A 305 represents a common grouping of entities. For example, a subject area 305 may contain one or more entity relating to customer accounts. Entity A 310 represents a grouping of interrelated attributes of the entity. An entity may be comprised of both required and optional attributes. Required attributed may include, for example, customer ID, an alternative ID, social security number, and telephone number. Optional attributes may include email address and birth date.

Using entity A as a blueprint, table space A 320 may be created as illustrated within the physical database view 315. Table A 325 comprises identifiers and required attributes as defined by entity A 310. The secondary table, table A1 330, contains the optional attributes as defined by entity A 310. In the physical database view 315, attributes as defined within entity a 310 have been de-normalized into two or more tables for storage considerations. The physical database view 315 contains adequate definitions in order to create the Data Description Language (DDL) code 360 to create the physical database.

According to the abstraction view 335 of the same attributes as those in entity A 310, a domain can be created to represent the entity similar to de-normalization that was performed in the physical database view 315, however, without the (or with minimal) tight coupling between the data names and structure. The attributes of entity A 310 have been broken down into individual but linked blocks. Block A 345 is the core block and contains all of the identifiers from entity A 310 including ID and Alt ID. Block A1 355 contains the required attributes that have been de-normalized into a separate block for service granularity considerations. Block A2 350 contains the optional attributes, also de-normalized into a separate block for service granularity considerations. Both blocks A1 355 and A2 350 are dependent on block A 345. Domain A 340 as defined in the abstraction view 335 ultimately results in the creation of XML code module 365 which is the physical domain.

While the steps outlined above represent an embodiment of the method, practitioners will appreciate that there are any number of computing algorithms that may be applied to create similar results. The steps are presented for the sake of explanation only and are not intended to limit the scope of the method in any way. Further, the method contemplates uses in association with web services, utility computing, pervasive and individualized computing, security and identity solutions, autonomic computing, commodity computing, mobility and wireless solutions, open source, biometrics, grid computing and/or mesh computing.

One skilled in the art will appreciate that the method described herein may employ any number of databases in any number of configurations. Further, any databases discussed herein may be any type of database, such as relational, hierarchical, graphical, object-oriented, and/or other database configurations. Common database products that may be used to implement the databases include DB2 by IBM (White Plains, NY), various database products available from Oracle Corporation (Redwood Shores, Calif.), Microsoft Access or Microsoft SQL Server by Microsoft Corporation (Redmond, Wash.), or any other suitable database product. Moreover, the databases may be organized in any suitable manner, for example, as data tables or lookup tables. Each record may be a single file, a series of files, a linked series of data fields or any other data structure. Association of certain data may be accomplished through any desired data association technique such as those known or practiced in the art. For example, the association may be accomplished either manually or automatically. Automatic association techniques may include, for example, a database search, a database merge, GREP, AGREP, SQL, using a key field in the tables to speed searches, sequential searches through all the tables and files, sorting records in the file according to a known order to simplify lookup, and/or the like. The association step may be accomplished by a database merge function, for example, using a "key field" in pre-selected databases or data sectors.

More particularly, a "key field" partitions the database according to the high-level class of objects defined by the key field. For example, certain types of data may be designated as a key field in a plurality of related data tables and the data tables may then be linked on the basis of the type of data in the key field. The data corresponding to the key field in each of the linked data tables is preferably the same or of the same type. However, data tables having similar, though not identical, data in the key fields may also be linked by using AGREP, for example. In accordance with one aspect of the method, any suitable data storage technique may be utilized to store data without a standard format. Data sets may be stored using any suitable technique, including, for example, storing individual files using an ISO/IEC 7816-4 file structure; implementing a domain whereby a dedicated file is selected that exposes one or more elementary files containing one or more data sets; using data sets stored in individual files using a hierarchical filing system; data sets stored as records in a single file (including compression, SQL accessible, hashed via one or more keys, numeric, alphabetical by first tuple, etc.); Binary Large Object (BLOB); stored as ungrouped data elements encoded using ISO/IEC 7816-6 data elements; stored as ungrouped data elements encoded using ISO/IEC Abstract Syntax Notation (ASN.1) as in ISO/IEC 8824 and 8825; and/or other proprietary techniques that may include fractal compression methods, image compression methods, etc.

In one exemplary embodiment, the ability to store a wide variety of information in different formats is facilitated by storing the information as a BLOB. Thus, any binary information can be stored in a storage space associated with a data set. As discussed above, the binary information may be stored on the financial transaction instrument or external to but affiliated with the financial transaction instrument. The BLOB method may store data sets as ungrouped data elements formatted as a block of binary via a fixed memory offset using either fixed storage allocation, circular queue techniques, or best practices with respect to memory management (e.g., paged memory, least recently used, etc.). By using BLOB methods, the ability to store various data sets that have different formats facilitates the storage of data associated with the method by multiple and unrelated owners of the data sets. For example, a first data set which may be stored may be provided by a first party, a second data set which may be stored may be provided by an unrelated second party, and yet a third data set which may be stored, may be provided by an third party unrelated to the first and second party. Each of these three exemplary data sets may contain different information that is stored using different data storage formats and/or techniques. Further, each data set may contain subsets of data that also may be distinct from other subsets.

As stated above, in various embodiments of the method, the data can be stored without regard to a common format. However, in one exemplary embodiment of the method, the data set (e.g., BLOB) may be annotated in a standard manner when provided for manipulating the data onto the financial transaction instrument. The annotation may comprise a short header, trailer, or other appropriate indicator related to each data set that is configured to convey information useful in managing the various data sets. For example, the annotation may be called a "condition header", "header", "trailer", or "status", herein, and may comprise an indication of the status of the data set or may include an identifier correlated to a specific issuer or owner of the data. In one example, the first three bytes of each data set BLOB may be configured or configurable to indicate the status of that particular data set; e.g., LOADED, INITIALIZED, READY, BLOCKED, REMOVABLE, or DELETED. Subsequent bytes of data may be used to indicate for example, the identity of the issuer, user, transaction/membership account identifier or the like. Each of these condition annotations are further discussed herein.

The data set annotation may also be used for other types of status information as well as various other purposes. For example, the data set annotation may include security information establishing access levels. The access levels may, for example, be configured to permit only certain individuals, levels of employees, companies, or other entities to access data sets, or to permit access to specific data sets based on the transaction, merchant, issuer, user or the like. Furthermore, the security information may restrict/permit only certain actions such as accessing, modifying, and/or deleting data sets. In one example, the data set annotation indicates that only the data set owner or the user are permitted to delete a data set, various identified users may be permitted to access the data set for reading, and others are altogether excluded from accessing the data set. However, other access restriction parameters may also be used allowing various entities to access a data set with various permission levels as appropriate.

The data, including the header or trailer may be received by a stand alone interaction device configured to add, delete, modify, or augment the data in accordance with the header or trailer. As such, in one embodiment, the header or trailer is not stored on the transaction device along with the associated issuer-owned data but instead the appropriate action may be taken by providing to the transaction instrument user at the stand alone device, the appropriate option for the action to be taken. The method may contemplate a data storage arrangement wherein the header or trailer, or header or trailer history, of the data is stored on the transaction instrument in relation to the appropriate data.

One skilled in the art will also appreciate that, for security reasons, any databases, systems, devices, servers or other objects of the method may consist of any combination thereof at a single location or at multiple locations, wherein each database or system includes any of various suitable security features, such as firewalls, access codes, encryption, decryption, compression, decompression, and/or the like.

The various system objects discussed herein may include one or more of the following: a host server or other computing systems including a processor for processing digital data; a memory coupled to the processor for storing digital data; an input digitizer coupled to the processor for inputting digital data; an application program stored in the memory and accessible by the processor for directing processing of digital data by the processor; a display device coupled to the processor and memory for displaying information derived from digital data processed by the processor; and a plurality of databases. Various databases used herein may include: client data; merchant data; financial institution data; and/or like data useful in the operation of the method. As those skilled in the art will appreciate, user computer may include an operating system (e.g., Windows NT, 95/98/2000, OS2, UNIX, Linux, Solaris, MacOS, etc.) as well as various conventional support software and drivers typically associated with computers. The computer may include any suitable personal computer, network computer, workstation, minicomputer, mainframe or the like. User computer can be in a home or business environment with access to a network. In an exemplary embodiment, access is through a network or the Internet through a commercially-available web-browser software package.

As used herein, the term "network" shall include any electronic communications means which incorporates both hardware and software objects of such. Communication among the parties in accordance with the method may be accomplished through any suitable communication channels, such as, for example, a telephone network, an extranet, an intranet, Internet, point of interaction device (point of sale device, personal digital assistant, cellular phone, kiosk, etc.), online communications, satellite communications, off-line communications, wireless communications, transponder communications, local area network (LAN), wide area network (WAN), networked or linked devices, keyboard, mouse and/ or any suitable communication or data input modality. Moreover, although the method is frequently described herein as being implemented with TCP/IP communications protocols, the method may also be implemented using IPX, Appletalk, IP-6, NetBIOS, OSI or any number of existing or future protocols. If the network is in the nature of a public network, such as the Internet, it may be advantageous to presume the network to be insecure and open to eavesdroppers. Specific information related to the protocols, standards, and application software utilized in connection with the Internet is generally known to those skilled in the art and, as such, need not be detailed herein. See, for example, Dilip Naik, Internet Standards and Protocols (1998); Java 2 Complete, various authors, (Sybex 1999); Deborah Ray and Eric Ray, Mastering HTML 4.0 (1997); and Loshin, TCP/IP Clearly Explained (1997) and David Gourley and Brian Totty, HTTP, The Definitive Guide (2002), the contents of which are hereby incorporated by reference.

The various system objects may be independently, separately or collectively suitably coupled to the network via data links which includes, for example, a connection to an Internet Service Provider (ISP) over the local loop as is typically used in connection with standard modem communication, cable modem, Dish networks, ISDN, Digital Subscriber Line (DSL), or various wireless communication methods, see, e.g., Gilbert Held, Understanding Data Communications (1996), which is hereby incorporated by reference. It is noted that the network may be implemented as other types of networks, such as an interactive television (ITV) network. Moreover, the system contemplates the use, sale or distribution of any goods, services or information over any network having similar functionality described herein.

The method contemplates uses in association with web services, utility computing, pervasive and individualized computing, security and identity solutions, autonomic computing, commodity computing, mobility and wireless solutions, open source, biometrics, grid computing and/or mesh computing.

The computers discussed herein may provide a suitable website or other Internet-based graphical user interface which is accessible by users. In one embodiment, the Microsoft Internet Information Server (IIS), Microsoft Transaction Server (MTS), and Microsoft SQL Server, are used in conjunction with the Microsoft operating system, Microsoft NT web server software, a Microsoft SQL Server database system, and a Microsoft Commerce Server. Additionally, objects such as Access or Microsoft SQL Server, Oracle, Sybase, Informix MySQL, Interbase, etc., may be used to provide an Active Data Object (ADO) compliant database management system.

Any of the communications, inputs, storage, databases or displays discussed herein may be facilitated through a website having web pages. The term "web page" as it is used herein is not meant to limit the type of documents and applications that might be used to interact with the user. For example, a typical website might include, in addition to standard HTML documents, various forms, Java applets, JavaScript, active server pages (ASP), common gateway interface scripts (CGI), extensible markup language (XML), dynamic HTML, cascading style sheets (CSS), helper applications, plug-ins, and the like. A server may include a web service that receives a request from a web server, the request including a URL (http://yahoo.com/stockquotes/ge) and an IP address (123.56.789). The web server retrieves the appropriate web pages and sends the data or applications for the web pages to the IP address. Web services are applications that are capable of interacting with other applications over a communications means, such as the internet. Web services are typically based on standards or protocols such as XML, SOAP, WSDL and UDDI. Web services methods are well known in the art, and are covered in many standard texts. See, e.g., Alex Nghiem, IT Web Services: A Roadmap for the Enterprise (2003), hereby incorporated by reference.

The method may be described herein in terms of functional block objects, screen shots, optional selections and various processing steps. It should be appreciated that such functional blocks may be realized by any number of hardware and/or software objects configured to perform the specified functions. For example, the method may employ various integrated circuit objects, e.g., memory elements, processing elements, logic elements, look-up tables, and the like, which may carry out a variety of functions under the control of one or more microprocessors or other control devices. Similarly, the software elements of the method may be implemented with any programming or scripting language such as C, C++, Java, COBOL, assembler, PERL, Visual Basic, SQL Stored Procedures, extensible markup language (XML), with the various algorithms being implemented with any combination of data structures, objects, processes, routines or other programming elements. Further, it should be noted that the method may employ any number of conventional techniques for data transmission, signaling, data processing, network control, and the like. Still further, the method could be used to detect or prevent security issues with a client-side scripting language, such as JavaScript, VBScript or the like. For a basic introduction of cryptography and network security, see any of the following references: (1) "Applied Cryptography: Protocols, Algorithms, And Source Code In C," by Bruce Schneier, published by John Wiley and Sons (second edition, 1995); (2) "Java Cryptography" by Jonathan Knudson, published by O'Reilly and Associates (1998); (3) "Cryptography and Network Security: Principles and Practice" by William Stallings, published by Prentice Hall; all of which are hereby incorporated by reference.

These computer program instructions may be loaded onto a general purpose computer, special purpose computer, or other programmable data processing apparatus to produce a machine, such that the instructions that execute on the computer or other programmable data processing apparatus create means for implementing the functions specified in the flowchart block or blocks. These computer program instructions may also be stored in a computer-readable memory that can direct a computer or other programmable data processing apparatus to function in a particular manner, such that the instructions stored in the computer-readable memory produce an article of manufacture including instruction means which implement the function specified in the flowchart block or blocks. The computer program instructions may also be loaded onto a computer or other programmable data processing apparatus to cause a series of operational steps to be performed on the computer or other programmable apparatus to produce a computer-implemented process such that the instructions which execute on the computer or other programmable apparatus provide steps for implementing the functions specified in the flowchart block or blocks.

Accordingly, functional blocks of the block diagrams and flowchart illustrations support combinations of means for performing the specified functions, combinations of steps for performing the specified functions, and program instruction means for performing the specified functions. It will also be understood that each functional block of the block diagrams and flowchart illustrations, and combinations of functional blocks in the block diagrams and flowchart illustrations, can be implemented by either special purpose hardware-based computer systems which perform the specified functions or steps, or suitable combinations of special purpose hardware and computer instructions.

Benefits, other advantages, and solutions to problems have been described herein with regard to specific embodiments. However, the benefits, advantages, solutions to problems, and any element(s) that may cause any benefit, advantage, or solution to occur or become more pronounced are not to be construed as critical, required, or essential features or elements of any or all the claims or the method. It should be understood that the detailed description and specific examples, indicating exemplary embodiments of the method, are given for purposes of illustration only and not as limitations. Many changes and modifications within the scope of the method may be made without departing from the spirit thereof, and the method includes all such modifications. Corresponding structures, materials, acts, and equivalents of all elements in the claims below are intended to include any structure, material, or acts for performing the functions in combination with other claim elements as specifically claimed. The scope of the method should be determined by the appended claims and their legal equivalents, rather than by the examples given above.

What is claimed is:

1. A method executing within a computer system having at least one processor for defining a service-based interface, said method including:
   defining a plurality of entities representing data elements, wherein said plurality of entities includes at least one of a fundamental entity, an identifier entity, a dependent entity and a relationship entity;
   defining relationships among said plurality of entities;
   creating a data abstraction layer by configuring a domain with a block within a markup language module, wherein said block represents one of said plurality of entities; and
   defining a service interface layer comprising a service having a relationship with said domain, wherein said service interface layer further comprises a plurality of services and wherein said service comprises a reference to said domain within said data abstraction layer.

2. The method of claim 1, wherein said plurality of entities includes a fundamental entity which represents a primary data element.

3. The method of claim 1, wherein said plurality of entities includes an identifier entity relating to said data abstraction layer domain.

4. The method of claim 1, wherein said plurality of entities includes a dependent entity, where said dependent entity depends from a fundamental entity.

5. The method of claim 1, wherein said plurality of entities includes a relationship entity, wherein said relationship entity represents a relationship between said plurality of entities.

6. The method of claim 1, wherein a name associated with said data abstraction layer domain relates to a relationship with an owning data abstraction layer domain.

7. The method of claim 1, wherein said plurality of entities includes a fundamental entity, wherein said fundamental entity is represented by a core block structure within said markup language module.

8. The method of claim 7, wherein said core block is stereotyped as at least one of independent and associate.

9. The method of claim 1, wherein said plurality of entities includes a dependent entity, wherein said dependent entity represents a non-core block structure within said markup language module.

10. The method of claim 9, wherein said non-core block structure is stereotyped as at least one of dependent, subset, collection, relationship and recursive.

11. The method of claim 1, wherein said plurality of entities includes a relationship entity, wherein a relationship block is based upon said relationship entity, and wherein each side of said relationship block includes identifiers.

12. The method of claim 1, wherein said block is hierarchically linked within said markup language module.

13. The method of claim 1, wherein said markup language module is an extensible markup language (XML) module.

14. The method of claim 1, wherein said service provides an interface for a specialized function that is invoked by at least one of an application, a system, and an object.

15. The method of claim 1, wherein said service invokes a business function.

16. An article of manufacture comprising a computer-readable memory having stored thereon a plurality of instructions, the plurality of instructions comprising:
   instructions for defining a plurality of entities representing data elements, wherein said plurality of entities includes at least one of a fundamental entity, an identifier entity, a dependent entity and a relationship entity;
   instructions for defining relationships among said plurality of entities; ad
   instructions for creating a data abstraction layer by configuring a domain with a block within a markup language module, wherein said block represents one of said plurality of entities; and
   instructions for defining a service interface layer comprising a service having a relationship with said domain, wherein said service interface layer further comprises a plurality of services and wherein said service comprises a reference to said domain within said data abstraction layer.

17. A method executing within a computer system having at least one processor for defining a service-based interface comprising:
   defining a data view based upon a relationship between a plurality of entity classifications;
   presenting said data view to a service having an association with an object;
   defining a plurality of entities representing data elements, wherein said plurality of entities includes at least one of a fundamental entity, an identifier entity, dependent entity and relationship entity;
   defining relationships among said plurality of entities;
   defining a service interface layer comprising said service having a relationship with a domain;
   configuring said domain with a block within a markup language module, wherein said block represents one of said plurality of entities;
   defining a data abstraction layer comprising said domain; and
   adding to said service a reference to said domain within said data abstraction layer.

18. The method of claim 17, further comprising invoking, by said service, a business function.

19. The method of claim 17, further comprising querying, by said service, said domain in accordance with a message.

* * * * *